(12) United States Patent  (10) Patent No.: US 7,623,149 B2
Winegard  (45) Date of Patent: Nov. 24, 2009

(54) INTEGRATED SECURE ENCRYPTION APPARATUS

(75) Inventor: Robert Winegard, Laurel, MD (US)

(73) Assignee: Criticom, Inc., Lanham, MD (US)

( * ) Notice: Subject to any disclaimer, the term of this patent is extended or adjusted under 35 U.S.C. 154(b) by 1068 days.

(21) Appl. No.: 10/663,036

(22) Filed: Sep. 15, 2003

(65) Prior Publication Data

US 2004/0111739 A1  Jun. 10, 2004

Related U.S. Application Data

(60) Provisional application No. 60/410,683, filed on Sep. 13, 2002.

(51) Int. Cl.
  *H04N 7/14* (2006.01)
(52) U.S. Cl. .................. 348/14.01; 348/14.11
(58) Field of Classification Search .............. 348/14.01, 348/14.11; 379/93.02
  See application file for complete search history.

(56) References Cited

U.S. PATENT DOCUMENTS 4,903,298 A * 2/1990 Cline ..................... 380/270
5,056,136 A * 10/1991 Smith ..................... 380/211
5,062,136 A * 10/1991 Gattis et al. .............. 379/93.21
6,549,229 B1 * 4/2003 Kirby et al. .............. 348/14.01

* cited by examiner

*Primary Examiner*—Stella L Woo
(74) *Attorney, Agent, or Firm*—The Farrell Law Firm, LLP

(57) ABSTRACT

An integrated secure encryption apparatus in one embodiment of the present invention is a self-contained secure console providing switch selectable secure and non-secure communications using the H.320 encoding standard. The system provides a standardized system for secure/non-secure videoconferencing communications systems employing three levels of protection: shielding, physical separation and fiber optic isolation. The system in one aspect includes an inverse multiplexer for receiving and converting data. A VWS black side switch is connected to the inverse multiplexer, and also connected to an encryption device at a Second contact of the VWS black side switch and connected to a VWS red side switch at a Contact 1 of the VWS black side switch. The VWS red side switch is connected to a codec, for example, a video conferencing codec. In a secure mode, Contact 1s of the VWS switches are disabled to allow data to be routed between the second contacts via the encryption device.

25 Claims, 4 Drawing Sheets

INTEGRATED SECURE ENCRYPTION APPARATUS

CROSS-REFERENCE TO RELATED APPLICATIONS

This application claims the benefit of U.S. Provisional Application No. 60/410,683 filed on Sep. 13, 2002, entitled "Integrated Secure Encryption Apparatus."

TECHNICAL FIELD

The present invention relates generally to computer security systems and more particularly to an integrated secure and non-secure video conferencing apparatus.

BACKGROUND

Teleconferencing systems allow virtual meetings among two or more remotely located participants to take place using the existing telephone or data network connections. A simple teleconferencing may involve an audio conferencing in which the participants share a speakerphone over a conventional telephone connection. In addition to the audio capabilities, a more sophisticated teleconferencing may involve videoconferencing in which participants can see images of one another during the conference.

Videoconferencing typically utilizes non-secure data lines for routing communications data among the participants. Accordingly, if users need to communicate sensitive or classified data, special arrangements have to be made before the videoconferencing can take place. For example, in the United States (U.S.), U.S. Department of Defense's communication security (COMSEC) and electromagnetic security (EMSEC) guidance and policy requirements for providing secure and non-secure applications call for secure videoconferencing when communicating highly sensitive national security data.

Secure conferencing system installations, however, are traditionally labor intensive and require a site-survey and design by a specialized secure integration engineers. In addition, the installations are usually designed with little consideration for ease of use. Frequently, a full time on-site technician is needed to complete the numerous "patches" and rerouting to transition between secure and non-secure connections. Thus, there is a need for a videoconferencing system, for example, a videoconferencing system (VTC) that enables users to perform videoconferencing in a secure and non-secure environment while maintaining features such as on screen dialing for ease of use.

SUMMARY

To overcome the shortcomings of the existing videoconferencing systems, there is provided a system and a method for performing secure communications. In one aspect the system includes an inverse multiplexer (IMUX) that receives ISDN channel data and converts the data to RS-530/449 interface. A secure/non-secure signal switching module (VWS) black side switch includes an electromechanical relay having a Contact 1, a Contact 2, and a Contact 3, and is coupled to the IMUX via the Contact 3. The VWS switch's Contact 1 and Contact 2 are enabled and disabled by a controller depending on an operating mode of the communications system. For example, the VWS black side switch's Contact 1 is connected directly to a Contact 1 of a VWS red side switch, also having a Contact 2 and a Contact 3, for routing data directly between the switches when the system is operating in non-secure mode. Optionally, also in non-secure mode, the switches are coupled to one another via a plurality of fiber optics modems, wherein the data is converted to optical data during communications between the switches. The VWS red side switch is coupled to a video conferencing codec at its Contact 3.

When the system is operating in secure mode, the two switches' Contact 2s are enabled. The two switches' Contact 2s are coupled to one another via an encryption device such as KIV 7 or KIV 19 modules. Thus, in secure mode, data is routed to a secure module connecting the switches. A controller coupled to the switches determines the operating mode and enables Contact 1 and Contact 2 of the switches accordingly. The default operating mode of the system is the secure operating mode.

A method for providing secure communications in one aspect includes determining an operating mode, and if the operating mode is a secure mode, enabling Contact 2s of two VWS switches and communicating data between the two VWS switches via a secure module. If the operating mode is a non-secure mode, the method in one aspect includes enabling Contact 1s of the two VWS switches and communicating data between the two VWS switches via a plurality of fiber optics modems connecting the two VWS switches. In this case, the data routed between the two VWS switches are further converted to optical signals during the routing.

DETAILED DESCRIPTION

Figure 1:
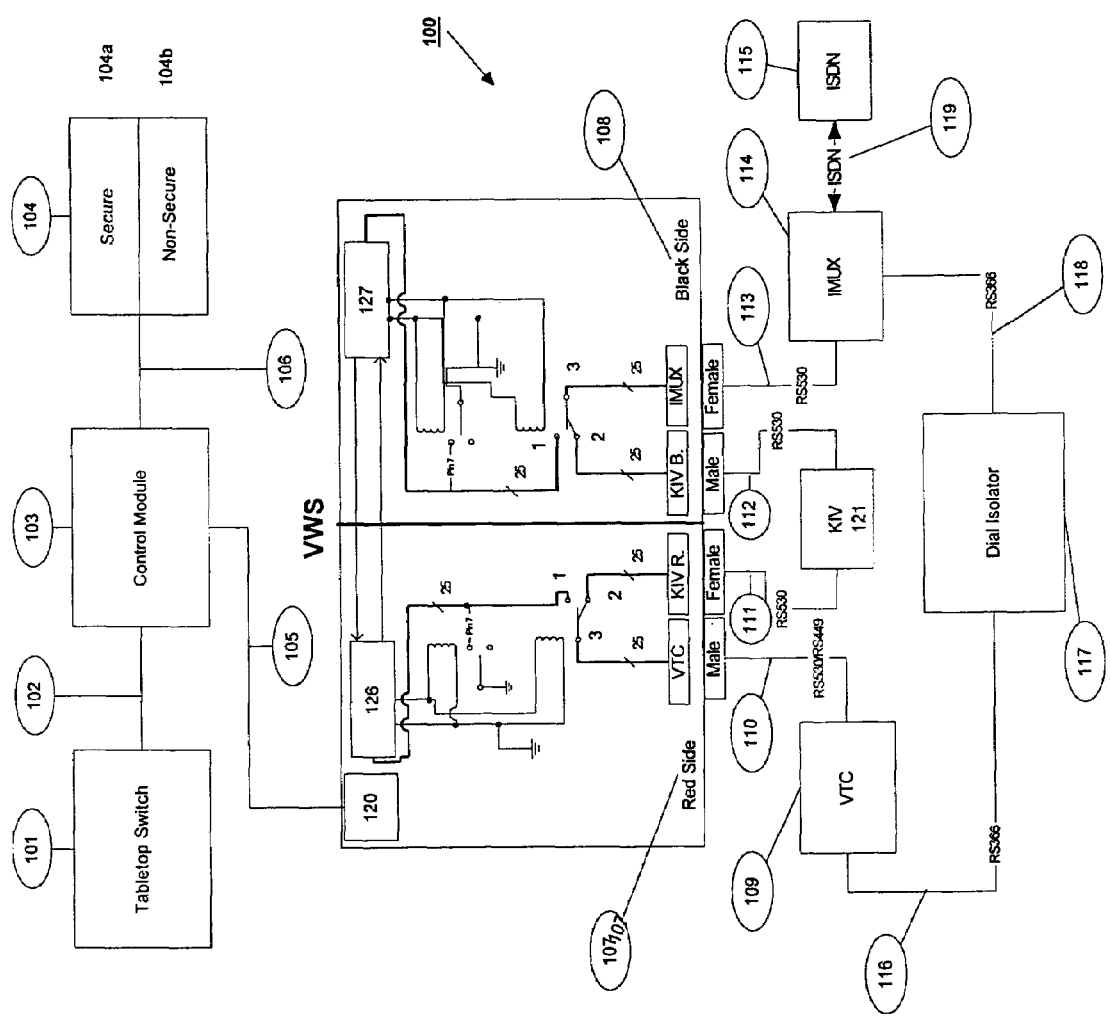
FIG. 1 is a diagram illustrating the components of the secure/non-secure video conferencing system in one embodiment.

An Integrated Secure Encryption Console (ISEC or system) in one embodiment is a standardized system for secure/non-secure videoconferencing communications systems.

Supporting secure and non-secure videoconferencing within the same system requires compliance with COMSEC/EMSEC criteria. Essentially, the criteria require red/black signal separation and isolation as well as Tempest emanation management. Throughout the application "red" is used to denote non-secure signals and communications, and "black" is used to denote secure signals and communications. This is achieved by engineering systems so that non-encrypted sensitive classified data is not transmitted intentionally or unintentionally outside of the Tempest zone, which could lead to the potential interception by adversarial third parties.

The present invention employs fiber optic coupling, waveguide technologies and a VWS switching design to provide failsafe certified separation and isolation. An incorporated mode indicator, for example a lighting system or other visual display, and toggle switch provides additional visual confirmation of status and further eliminates any opportunity for user error. Unlike systems built upon untested and unconfirmable manual A/B switching, the present invention provides verifiable failsafe compliance. Integrated KIV 7 or KIV 19 housings support standard Type 1 ISDN encryption devices. Additional optical separation has been engineered into the KIV 19 housing to support on-screen dialing. The present invention supports the same user-friendly "point and click" call origination routines for both secure and non-secure calls.

To overcome the shortcomings of existing videoconferencing systems and to address security issues for users that desire to utilize their video conferencing system in a secure or non-secure mode, the present invention has been developed. The system addresses secure/non-secure video communications with the desire to meet and exceed COMSEC/EMSEC or emanations security criteria. The system solves this issue at the core with the VWS switch component.

The system features a reliable and failsafe switch in a self-contained security console providing user-friendly, switch selectable, secure and non-secure H.320 communications. Users simply flip a tabletop switch and the system performs the remaining functions. The system enables clients to meet COMSEC and EMSEC guidance and policy requirements with COTS-like simplicity and at a life-cycle price significantly below traditional custom designs. Offering the first standardized system solution for switch-selectable encrypted videoconferencing communications, the system eliminates the need for costly engineering and simplifies classified installations and follow-on support. The system integrates network termination equipment, IMUX, the VWS, encryption signal isolation, dial isolator, ISEC control module, KIV 7 mounting rack, and a special KIV 19 mounting rack to create a single, user-friendly system. The modular design of the system also offers encryption, IMUX and future IP configuration options. The system according to an embodiment of the present invention enables secure/non-secure switched videoconferencing on the same system. The system also has: a single table-top control switch to provide ease of operation between security modes with the "flip of a switch"; "on-screen" dialing in secure mode for KIV 7 and "on screen" dialing for KIV 19; a large wall-mountable secure/non-secure mode indicator, providing continual security mode notification; identical on-screen and address book dialing for both secure and non-secure sessions; and a switching design that exceeds COMSEC/EMSEC guidelines. In addition, the system: supports standard industry serial video conferencing interfaces (RS-449, RS-530, and RS-366); and simplifies and reduces life-cycle support costs, including the need for dedicated technical staff; eliminates complicated cable switching and confusing IMUX dialing; provides government-certified TEMPEST-Level 1 for operation in zones A, B, C, and D; , avoids untested A/B switches and potential for compromised security; includes fully integrated primary rate interface (PRI) or basic rate interface (BRI) IMUX or optional GFE IMUX reuse; includes standard KIV 7 or KIV 19 cryptographic housing with modularity to integrate IP or legacy KG encryption; and features fully enclosed cabinet with lockable front and rear doors.

The system in one aspect is embodied as a self-contained secure console providing switch selectable secure and non-secure communications using the H.320 encoding standard. As known to those skilled in the art, the H.320-series governs the basic video-telephony concepts of audio, video and graphical communications by specifying requirements for processing audio and video information, providing common formats for compatible audio/video inputs and outputs, and protocols that allow a multimedia terminal to utilize the communications links and synchronization of audio and video signals. Like the other multimedia teleconferencing standards, H.320 applies to multipoint and point-to-point sessions. The H.320 suite addresses videoconferencing over circuit switched services such as ISDN.

The system in one aspect integrates network termination equipment with encryption signal isolation using KIV 7 or KIV 19 encryption devices in a single cabinet that supports RS-366 dialing features. As known to those skilled in the art, KIV 7 or KIV 19 encryption devices generally refer to a family of embeddable COMSEC modules available as lightweight, compact, commercial off-the-shelf (COTS) cryptographic devices that provide protection for digital and voice communications. The system provides a "turn-key" method of shared utilization of videoconferencing (VTC) systems in both secure and non-secure applications.

The system according to the present invention provides both secure and non-secure selections for VTC systems while supporting on-screen dialing from the VTC. The system is designed to meet current criteria for red/black separation in accordance with the following U.S. Department of Defense publications: NACSIM 5203—Guidelines for Facility Design and Red/Black Installation; NSTISSAM—Tempest Red/Black Installation Guidance; MIL-HDBK-232—Red/Black Engineering—Installation Guidelines; and, AFMAN 33-214V2—Emissions Security Countermeasures Review. The system complies with these criteria through a combination of shielding, physical separation and isolation/filtering. Cables in the system are braid shielded with metal EMI/RFI metal hoods. This eliminates capacitive Compromising Emanation (CE) of the red signals. CE generated from other sources within the control zone is prevented from being coupled (received) after the filtering and isolation within the system. Internal cable routing provides the maximum physical separation available and eliminates any parallel run of red and black cables where intersection is required.

At the heart of the system is the VWS, a self-contained module allowing remote controlled switching between secure and non-secure paths while maintaining the highest degree of red/black separation. The VWS is contained in a rack mountable metal EMI/RFI housing. The housing is divided into two separate chambers by an internal metal bulkhead. Each chamber provides two chassis mounted DB-25 connectors on the rear. The red chamber connectors are Codec and KIV-R. The black chamber is for the IMUX and KIV-B. Secure/non-secure mode selection is accomplished with presence/absence of A/C power to the VWS. Each chamber contains a set of 25 non-latching electromechanical relay contacts. The default (de-energized) relay state is the secure mode. During secure operation, the VWS is a completely passive connection with no active electronics. In fact, it has no power applied. The separate EMI/RFI chambers provide shielding between the red and black signals contained within each.

FIG. 1 is a diagram illustrating the components of the secure/non-secure video conferencing system in one embodiment. The system 100 is connected to ISDN BRI or PRI lines 115. These lines terminate at the IMUX 114 contained in the system. IMUX 114 may be implemented, for example, with the Adtran model ISU 512 inverse multiplexer BRI. The type of ISDN service available determines which option of IMUX is selected.

The IMUX 114 converts the ISDN channels to a RS-530/449 high-speed data interface 113. This connection is routed to the IMUX port of the VWS black side switch, which in turn is connected to Contact 3 of a first of two VWS switches 107 and 108. In a non-secure mode, Contact 1 of the VWS black side switch 108 routes directly to Contact 1 of the VWS red side switch 107, through the fiber optic modems 126 and 127 when used. The Contact 3 of the VWS red side switch 107 is connected to the VTC port, which in turn is connected to a RS-530/449 compliant network connection 110 of the VTC system 109. Contact 2 of the VWS red side switch is connected to the KIV-R port, and Contact 2 of the VWS black side switch is connected to the KIV-B port.

The VTC system 109 includes a codec for data conversion, compression and decompression into video formats, for presenting the conference to the user at the user end.

The transition to secure mode may be performed with a single push-button switch. This causes each VWS switch to change to Contact 2s. This path incorporates the encryption device 121, either a KIV 7 or KIV 19, depending on a client application. KIV 7, for example, may be enclosed in a Pulse Engineering model 3014-2 housing for KIV 7, and connected using KIV 7 Red/Black cables. KIV 19 may be enclosed in the Pulse Engineer model 5012-CTRL housing for KIV 19 and connected using KIV 19 Red/Black cables.

In the preferred embodiment, a user simply flips a switch on a tabletop switch module 101 into the "SECURE" or "NON-SECURE" mode. This triggers the system control module to perform several functions. Among them are:

A. In NON-SECURE mode:
1. Power up the system VWS switches 107 and 108, which in turn places the system into the non-secure mode, and
2. Changes a security status indicator display 104 to "NON-SECURE" 104b B. In SECURE mode:
1. Powers down the system VWS switches 107 and 108 and places the system into the secure mode, and
2. Changes the security status indicator display 104 to "SECURE" 104a.

At this point users can simply dial as they normally would if the system were not present. Any user can make secure or non-secure calls with no training. A number is dialed and the number string is transmitted to the IMUX 114 through an optical dial isolator module 117 to preserve red/black separation and the call is launched and received by the far end. The signal path from the VTC codec module 109 to the local IMUX 114 is determined by the VWS switches 107 and 108, and is either routed through the fiber optic isolators in the VWS switches 107 and 108, or directly to the encryption device (KIV 7 or KIV 19) for Secure data transmission.

Non-secure mode is selected by the application of A/C power to the VWS switches 107 and 108. A DC power supply in the black chamber applies current to the electro-mechanical relays and RS-530 photonic coupler. DC power is fed through a bulkhead filter energizing the switching relays and RS-530 photonic coupler of the red chamber as well. The relay's energized path routes the codec and IMUX signals to the now active RS-530 photonic coupler. Although the power and signal filtering are not a concern during non-secure operation, they are required to maintain separation between the red and black chambers during secure operation. The filter and isolator's characteristics would provide acceptable separation in an active (powered) condition. However, the design of the VWS switched 107 and 108 increases the isolation and separation level by terminating all power during secure operation. The VWS switches 107 and 108 provides the convenience and ease of use of an electro-mechanically-controlled switch while exceeding the electronic separation of manual red and black patch panels in separate EMI/RFI enclosures.

In addition to the VWS switches 107 and 108, the tabletop switch 101 engages a relay, which changes a secure/non-secure status indicator 104 so that the VTC user is aware of the current operational configuration or mode.

If the system is optioned to Secure mode, the relay also terminates power to a fiber optic line drivers. This is to prevent an unintended signal being conducted on the unencrypted path.

In addition to the RS-530/449 signal path, the VTC system may include a DB-25 connection 118 for RS-366 dialing information to be passed from the VTC codec 109 to the IMUX 114. This path is monitored during the secure operation to protect the sensitive information from being inductively coupled and carried to the outside world. The system incorporates a photo optic coupler in the RS-366 path. This converts the electronic voltages to a digitized light stream and then back again to electronic voltages. This "voltage to light" conversion breaks any potential conductive path and strips low voltage signals below the driver threshold.

The system in one aspect employs a combination of shielding, physical separation and isolation/filtering to accomplish a level of desired security, for example, current criteria for red/black separation.

The cables in the system are generally braid shielded with metal EMI/RFI metal hoods, primarily to contain any capacitive compromising emanation (CE) of the red signals. Although not required, all black cables may be shielded as well. This additional counter measure prevents any CE generated from other sources within the control zone from being coupled or received after the filtering and isolation within the system. Internal cable routing in one aspect provides a maximum physical separation available and eliminates any parallel run of Red and Black cables where intersection is required.

Filtering and isolation are accomplished by employing RS-366 dialing, RS-530/499 data path in non-secure and secure mode, and known encryption devices. The RS-366 path is utilized to establish both secure and non-secure calls. The RS-366 interface is a one-way path 118 providing dialing information from the VTC codec 109 to the IMUX 114. RS-366 information includes the number dialed and the quantity of channels requested (call speed). This information is exchanged during the call set-up and is not active once the call is established. Although no longer active, the RS-366 connection may still be a potential fortuitous conductor. The dial isolator 117 is incorporated in the RS-366 path 116 to filter and eliminate any coupled or induced CE. The photon-coupled design provides more than 120 dB isolation of 0-to-10 GHz frequencies. The dial isolator 117 in one embodiment may be implemented using a FiberPlex DI-366 dialing isolator.

The RS-530/449 data path is selectable between secure and non-secure mode. Switching may be accomplished via a single push button on the tabletop switch 101. A control module 103 changes the signal path via remote controlled VWS switches 107 and 108, along with the status indicators 104a and 104b, and isolation counter measures as described below.

In a non-secure mode, the RS-530/449 cable connection 110 for the codec 109 is routed to the Contact 3 of the codec side of the VWS red side switch 107. Contact 3 is connected to Contact 1. Contact 1 is connected to the matching port of the IMUX side of the VWS switch 108 via a set of fiber optic modems 126 and 127 housed within the system. The fiber optic modems 126 and 127 may be implemented, for example, with the Canoga Perkins model 2240 multimode modem. The power source 120 for the fiber optic modem is supplied via the a control module 103. In one embodiment, power for the modems is only supplied in the non-secure mode. The power controller 120 in one embodiment may be implemented using a power control module. Fiber optic modem 127 is connected to Contact 1 of the VWS switch 108, which connects to Contact 3. Contact 3 of the VWS switch 108, and is connected to the IMUX output port to complete the non-secure path.

In a secure mode, the secure path shares the common cables of the Contact 3s to the codec 109, IMUX 114, and VWS switches 107 and 108, respectively. When the secure mode is selected, both VWS switches are changed to Contact 2s, completing the encrypted data path 112. In one aspect, isolation from the non-secure path has three layers of protection. All contacts, including chassis and signal grounds in the VWS switches 107 and 108 are switched. The physical separation of the relay contacts provides conductive and low voltage capacitive isolation. The second and third layers of protection are incorporated into the fiber isolated feature. When secure mode operation is selected, power 120 to the fiber optic modems 126 and 127 in the non-secure path (Contact 2) is terminated by the controller 103. Even though the photon coupling of the optical connection alone provides a very high degree of isolation, the termination of modem power provides, in effect, a complete disconnect of the unencrypted path.

The encryption devices used in the secure path 111 may include KIV 7 or KIV 19 COMSEC devices. KIV 7 is designed as a terminal encryption device and supports RS-530 interface control leads. A standard KIV 7 front-loading 19-inch rack-mount housing is provided for KIV 7 applications. The system, when optioned for KIV 19, features a custom housing incorporating photon-coupled isolation of the required control signals. The physical appearances of the VTC system may be the same in either mode of operation and a participant in a secure VTC may not realize the current operating mode and thus freely discuss classified information on subsequent conferences over the same system. Thus, human errors may unintentionally defeat the most robust COMSEC countermeasures. To prevent the unintentional disclosure of sensitive information during a non-secure conference in situations such as this, the system includes the automated secure/non-secure status indicator 104. This provides a prominent visual reminder of the security level for the current conference. In one embodiment, the system 100 may be housed in any one of Great Lakes Cabinets part numbers GL6001, GL 6002, GL 6004, GL6010 cabinets, and Islatran LRA-101 power surge protect may be used to connect the system 100 to an external power supply.

Figure 2:
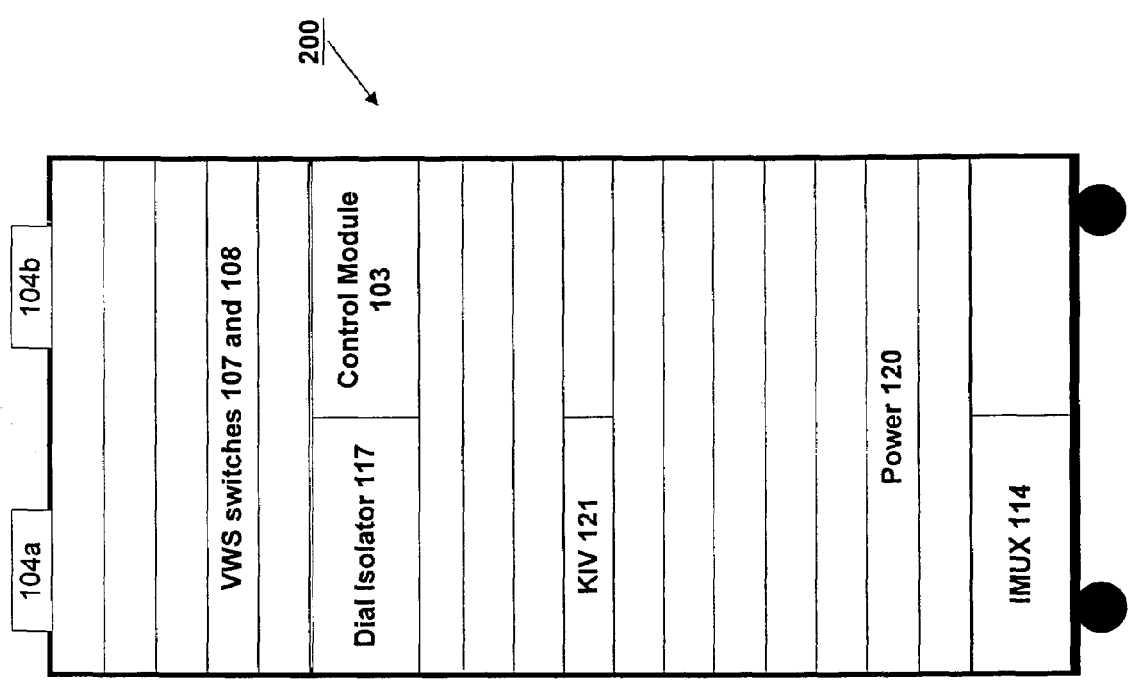
FIG. 2 illustrates the system housed in a cabinet in one embodiment.

FIG. 2 illustrates the system housed in a cabinet 200 in one embodiment. The system in one embodiment includes network termination equipment, IMUX 114, secure/non-secure signal VWS switching, encryption signal isolation and KIV 7 or KIV 19 devices as described with reference to FIG. 1 housed in the cabinet 200. The components are modular and thus provide COTS-like simplicity in design while meeting the COMSEC guidance and policy requirements. The tabletop switch 101 for selecting the secure or non-secure mode may be mounted externally on the cabinet 200, and/or optionally be included inside the cabinet 200. Large and conspicuous status displays 104a and 104b on the cabinet 200 allows users to easily access and confirm the selected security mode. Of course, the status displays can be placed in any location useful to the user. The pre-wired encryption housing permits simple insertion of encryption devices such as KIV 7 or KIV 19 encryption units. The system in one embodiment enables industry-standard, codec-based "on-screen" dialing and "address book" features to launch calls via videoconferencing system's menus in both secure and non-secure modes and provides an each front panel access for keying and unit optioning.

Figure 3A:
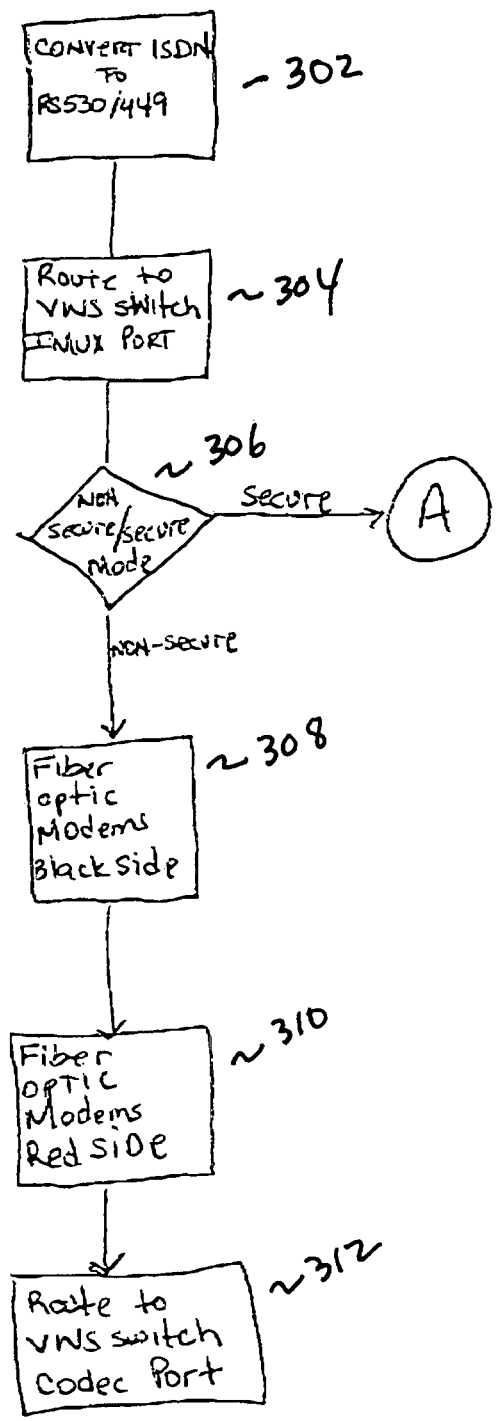
FIGS. 3A and 3B show a flow diagram illustrating a method in one embodiment for providing secure/non-secure video conferencing.
Figure 3B:
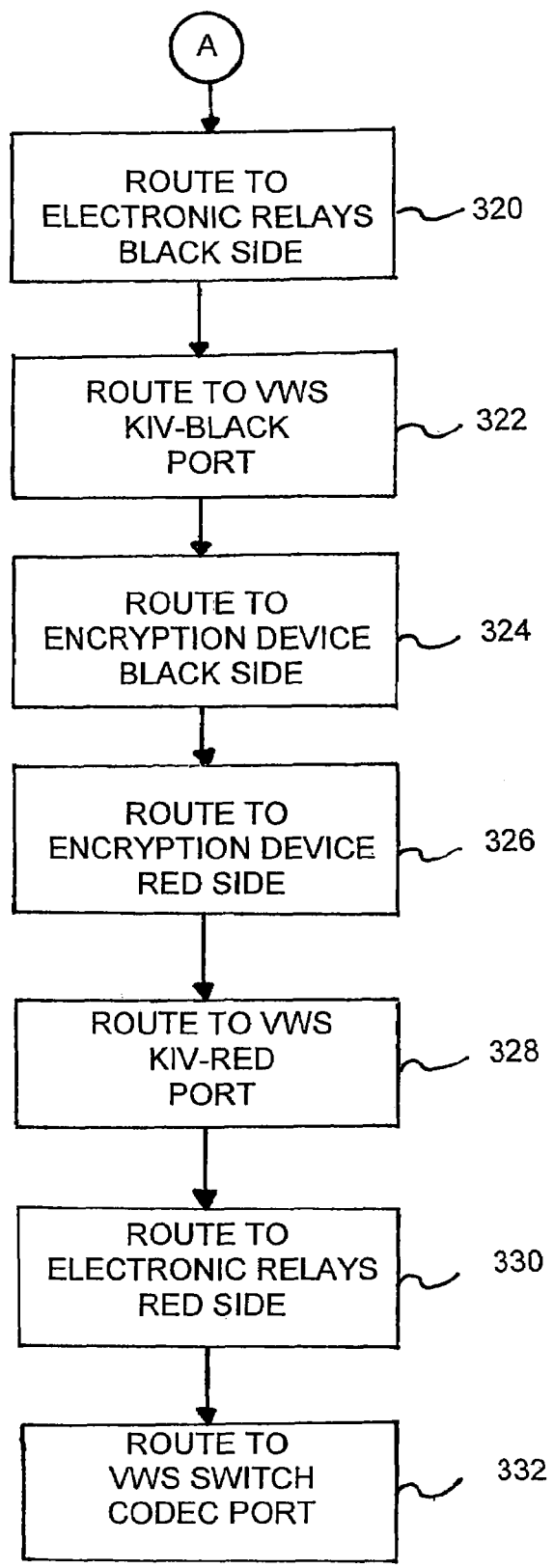

FIGS. 3A and 3B show a flow diagram illustrating a method in one embodiment for providing secure/non-secure video conferencing. At 302, ISDN channels are converted to RS-530/449 high-speed data interface at the IMUX 114. The connection is routed to the VWS red side switch 107. If it is determined at 306 that the current mode is in non-secure mode, at 310, the fiber interrupt is enabled. The connection is routed to the VWS black side switch 108 via fiber optics driver lines at 316.

At 306, if it is determined that the current mode is secure, the connection is switched to Contact 2s of the VWS switches and routing is done via an encryption device such as the KIV-19. At 320, the signal is routed to Contact 2. At 322 the signal is routed to the KIV-B port. At 324 the signal is routed through the KIV 121, and to KIV-R port at 328. Next the signal is routed to Contact 2 of VWS red side 107, and then routed through Contact 3 to VTC port. Routing is then performed via the RS-530/449 path to a VTC codec 109.

A 5020-CTRL housing is a rack mountable housing provided for KIV 19 adaptation. One half of the 5020-CTRL housing provides a front-loading KIV 19 bay similar to a standard KIV 19 rack mount housing. The KIV 19 was originally intended for use as a trunk encryption device, and, consequently, is limited to clock and data only. All VTC systems require operational RS-530/449 control leads to support on-screen dialing. The other half of the 5020-CTRL housing contains photonic coupled/fiber optic isolation for the required control lead support. Clock/data and control lead signals from the Codec and IMUX RS449/530 cables are separated at the rear panel of the 5020-CTRL housing. Clock and Data signals are routed to the KIV 19 for encryption as normal. The separated RS-530/499 control leads are routed to a photonic-coupled fiber optics isolator contained in the second half of the 5020-CTRL housing. Internal metal ducting provides appropriate shielding and separation of all signals within the 5020-CTRL housing.

Human error can unintentionally defeat the most robust COMSEC countermeasures. The physical appearances of the VTC system will be the same in either mode of operation and a participant in a secure VTC may logically assume that they can freely discuss classified information on subsequent conferences over the same system. To prevent the unintentional disclosure of sensitive information during a non-secure conference, the system according to the present invention provides an automated secure/non-secure status indicator display. This provides a prominent visual reminder of the security level for the current conference.

While the invention has been described with reference to several embodiments, it will be understood by those skilled in the art that the invention is not limited to the specific forms shown and described. Thus, various changes in form and details may be made therein without departing from the spirit and scope of the invention as defined by the appended claims.

What is claimed is:

1. An integrated secure videoconferencing communications system, comprising:
   an inverse multiplexer for receiving and converting data;
   a black side switch having a first relay that includes a first contact, a second contact, and a third contact, and coupled to the inverse multiplexer via the third contact;
   an encryption device coupled to the second contact of the black side switch;
   a red side switch having a second relay that includes a first contact, a second contact, and a third contact, and coupled to the encryption device via the second contact;
   a codec coupled to the red side switch via the third contact of the red side switch; and
   a controller coupled to the black side and the red side switches for powering down the switches in a secure mode and powering up the switches in a non-secure mode, wherein in the secure mode the relays default to connect the encryption device into a communication path.

2. The system of claim 1, wherein if the system is operating in a secure mode, the controller disables the first contacts of the black side and the red side switches, and the second contacts of the black side and red side switches are enabled to connect data path via the encryption device.

3. The system of claim 1, wherein if the system is operating in a non-secure mode, the controller enables the first contacts of the black and the red side switches.

4. The system of claim 1, further comprising means for on-screen dialing.

5. The system of claim 1, further comprising fiber optic isolation between all secure and non-secure signals.

6. The system of claim 1, wherein the system is in a secure operating mode when power is not supplied to the system.

7. The system of claim 1, further including:
a first fiber optics modem coupled to the first contact of the black side switch; and
a second fiber optics modem coupled to the first contact of the red side switch,
wherein data is communicated between the inverse multiplexer and the codec via the first and the second fiber optics modems.

8. The system of claim 1, further including a dial isolator module coupled to the codec by a first interface, the dial isolator further coupled to the inverse multiplexer by a second interface.

9. The system of claim 1, wherein the black side switch is coupled to the inverse multiplexer via an RS-530/449 interface.

10. The system of claim 1, wherein the red side switch is coupled to the codec via an RS-530/449 interface.

11. The system of claim 1, further including a power control module coupled to the controller and the first and the second fiber optics modems.

12. The system of claim 11, wherein the power control module terminates power supplied to the first and the second fiber optics modems when the system is operating in a secure mode.

13. The system of claim 1, further including a status indicator coupled to the controller for indicating an operating mode.

14. The system of claim 1, further including a switch coupled to the controller for selecting an operating mode.

15. The system of claim 1, wherein the encryption device is coupled to the black side and the red side switches via an RS-530/449 interface.

16. The system of claim 1, wherein the codec includes a serial interfaced videoconferencing codec.

17. The system of claim 1, wherein the encryption device includes KIV 7 module.

18. The system of claim 1, wherein the encryption device includes KIV 19 module.

19. A method for providing secure communications, comprising:
determining an operating mode;
if the operating mode is secure mode, powering down and defaulting to second contacts of two switches and communicating data between the two switches via a secure module; and
if the operating mode is non-secure mode, powering up and enabling first contacts of the two switches and communicating data between the two switches directly.

20. The method of claim 19, further including displaying the operating mode.

21. The method of claim 19, further including if the operating mode is non-secure mode, routing data between the two switches via a plurality of fiber optics modems.

22. The method of claim 19, further including if the operating mode is secure, routing data between the two switches through encryption devices and disconnecting the non-secure path between the two switches.

23. The method of claim 19, further including if the operating mode is secure, terminating power from a plurality of fiber optics modems coupling the two switches.

24. The method of claim 19, further including converting ISDN channel data to high speed RS-530/499 data.

25. An integrated secure videoconferencing communications system, comprising:
an inverse multiplexer for receiving and converting data;
a black side switch connected to the inverse multiplexer;
an encryption device connected to the black side switch;
a red side switch connected to the encryption device, and connected to the black side switch;
a codec connected to the red side switch; and
a controller for controlling the black side and the red side switches to power down and default to a secure path connection between the black side and the red side switches via the encryption device or to power up and enable a non secure path connection directly between the black side and the red side switches.

* * * * *